United States Patent
Yamada

(10) Patent No.: US 10,185,905 B2
(45) Date of Patent: Jan. 22, 2019

(54) PRINTING APPARATUS AND CONTROL METHOD FOR PRINTING APPARATUS

(71) Applicant: Seiko Epson Corporation, Tokyo (JP)

(72) Inventor: Tsutomu Yamada, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/433,530

(22) Filed: Feb. 15, 2017

(65) Prior Publication Data
US 2017/0243094 A1    Aug. 24, 2017

(30) Foreign Application Priority Data

Feb. 18, 2016 (JP) ................. 2016-029377

(51) Int. Cl.
| | |
|---|---|
| *G06K 15/00* | (2006.01) |
| *B41J 3/407* | (2006.01) |
| *G06K 15/02* | (2006.01) |
| *G06F 3/12* | (2006.01) |

(52) U.S. Cl.
CPC ........ *G06K 15/4045* (2013.01); *B41J 3/4075* (2013.01); *G06F 3/1204* (2013.01); *G06F 3/1258* (2013.01); *G06F 3/1285* (2013.01); *G06F 3/1292* (2013.01); *G06K 15/022* (2013.01); *G06K 15/028* (2013.01); *G06K 2215/0097* (2013.01)

(58) Field of Classification Search
USPC ...................................................... 358/1.13
See application file for complete search history.

(56) References Cited

U.S. PATENT DOCUMENTS

| | | | |
|---|---|---|---|
| 2003/0054859 A1* | 3/2003 | Goto | H04B 1/3877 455/557 |
| 2006/0198679 A1 | 9/2006 | Tanaka et al. | |
| 2008/0291283 A1* | 11/2008 | Achiwa | H04N 1/00204 348/207.2 |

(Continued)

FOREIGN PATENT DOCUMENTS

| | | | | |
|---|---|---|---|---|
| EP | 1942444 A2 * | 7/2006 | ........... | G06K 13/008 |
| EP | 1942444 | 7/2008 | | |

(Continued)

OTHER PUBLICATIONS

Yoshida Satoru, Control Method of Recording Device Recording Device and Control Program, Jan. 2, 2016, Machine Translated Japanese Patent Application Publication, JP2016016631, All Pages.*

(Continued)

*Primary Examiner* — Ngon Nguyen
(74) *Attorney, Agent, or Firm* — ALG Intellectual Property, LLC

(57) ABSTRACT

A tape printing apparatus includes an input unit for inputting information, a posture determining unit configured to determine an apparatus posture, and an operation-mode setting unit configured to set an operation mode in one of a first mode for receiving printing data from an external apparatus and a second mode for generating printing data on the basis of the information input from the input unit without receiving the printing data from the external apparatus. The operation-mode setting unit sets the operation mode according to the apparatus posture determined by the posture determining unit.

9 Claims, 6 Drawing Sheets

(56) References Cited

U.S. PATENT DOCUMENTS

| | | |
|---|---|---|
| 2009/0117849 A1 | 5/2009 | Mizoguchi |
| 2009/0257088 A1 | 10/2009 | Tokashiki |
| 2012/0268756 A1* | 10/2012 | Kurashina .............. B41J 3/4075 358/1.9 |
| 2013/0258404 A1* | 10/2013 | Tabata ............... H04N 1/00281 358/1.15 |
| 2014/0022568 A1 | 1/2014 | Nakaya |
| 2014/0199105 A1 | 7/2014 | Tsukuda |
| 2014/0327787 A1 | 11/2014 | Tsujimoto |
| 2015/0149547 A1 | 5/2015 | Nakamura |
| 2015/0365985 A1 | 12/2015 | Terashita |
| 2017/0006178 A1 | 1/2017 | Yamada et al. |
| 2017/0180595 A1 | 6/2017 | Tokumaru et al. |

FOREIGN PATENT DOCUMENTS

| | | |
|---|---|---|
| JP | 2004-025468 | 1/2004 |
| JP | 2005-349746 A | 12/2005 |
| JP | 2009-075410 A | 4/2009 |
| JP | 2013-206227 A | 10/2013 |
| JP | 2014-133377 A | 7/2014 |
| JP | 2016-016631 | 1/2016 |

OTHER PUBLICATIONS

European Search Report issued in related Patent Application No. EP-17156282, dated Jun. 30, 2017.
King Jim Co., Ltd., Tepra Pro SR550 user manual, Oct. 2013, p. 14, King Jim Co., Ltd., Japan.
European Search Report issued in related Patent Application No. EP-17156271, dated Jul. 10, 2017.

\* cited by examiner

PRINTING APPARATUS AND CONTROL METHOD FOR PRINTING APPARATUS

BACKGROUND

1. Technical Field

The present invention relates to a printing apparatus capable of switching an operation mode and a control method for the printing apparatus.

2. Related Art

A tape printing apparatus described in "TEPRA" PRO SR550 user's manual, page 14, October 2013, Second Edition, King Jim Co., Ltd. (Non Patent Literature 1) has been known as a technique of this type. Non Patent Literature 1 discloses a technique for switching, with pressing of a dedicated button, an external communication mode (a personal computer link mode) for creating a label on the basis of printing data transmitted from a personal computer and a standalone mode for creating a label on the basis of an input to a keyboard mounted on the tape printing apparatus.

On the other hand, among tape printing apparatuses capable of communicating with a personal computer via a dedicated cable, there is a model that detects cable connection and switches the standalone mode to the external communication mode.

In recent years, a tape printing apparatus capable of receiving printing data from a smartphone, a personal computer adapted to wireless communication, and the like via the wireless communication has been widely used. When the tape printing apparatus is connected to a host apparatus via the wireless communication in this way, a method of detecting cable connection and switching an operation mode cannot be adopted. Therefore, it is conceivable to adopt a method of detecting pressing of a dedicated button and switching the operation mode. However, when the tape printing apparatus is used in the external communication mode, the tape printing apparatus is often used in "vertical installation (see FIG. 1)" in order to reduce a setting area as much as possible. In this state, there is a problem in that it is difficult to operate buttons. A user has a demand for saving labor and time for button operation for switching the operation mode.

SUMMARY

An advantage of some aspects of the invention is to provide a printing apparatus capable of easily performing switching of an operation mode and a control method for the printing apparatus.

A printing apparatus according to an aspect of the invention includes: an input unit for inputting information; a posture determining unit configured to determine an apparatus posture; and an operation-mode setting unit configured to set an operation mode in one of a first mode for receiving printing data from an external apparatus and a second mode for generating printing data on the basis of the information input from the input unit without receiving the printing data from the external apparatus. The operation-mode setting unit sets the operation mode according to the apparatus posture determined by the posture determining unit.

A control method for a printing apparatus according to an aspect of the invention is a control method for a printing apparatus including an input unit for inputting information, the control method for the printing apparatus including: determining an apparatus posture; and setting an operation mode in one of a first mode for receiving printing data from an external apparatus and a second mode for generating printing data on the basis of the information input from the input unit without receiving the printing data from the external apparatus. In setting the operation mode, the operation mode is set according to the determined apparatus posture.

With the configuration according to the aspect of the invention, because the operation mode is set according to the apparatus posture, it is possible to easily switch the operation mode simply by changing the apparatus posture. When the first mode (an external communication mode) is used, the printing apparatus is often set in a specific posture in which a setting area of the printing apparatus is small. Therefore, when it is determined that the printing apparatus is in the posture, by setting the operation mode in the first mode, it is possible to switch the operation mode to an appropriate operation mode without causing a user to be aware of the switching of the operation mode.

In the printing apparatus, the first mode may be a mode for disabling the information input from the input unit.

With the configuration according to the aspect of the invention, it is possible to prevent wrong operation of the input unit during the first mode setting.

In the printing apparatus, the posture determining unit may always determine the apparatus posture in a power-on state of the printing apparatus.

With the configuration according to the aspect of the invention, it is possible to switch the operation mode simply by changing the apparatus posture (without requiring operation of a power supply button).

In the printing apparatus, the posture determining unit may determine the apparatus posture during power-on of the printing apparatus and not determine the apparatus posture after the power-on.

With the configuration according to the aspect of the invention, it is possible to prevent a deficiency in which the operation mode is switched against an intention of the user according to a change of the apparatus posture during normal use.

In the printing apparatus, the posture determining unit may determine whether the apparatus posture is a predetermined first posture. The operation-mode setting unit sets the operation mode in the first mode when the posture determining unit determines that the apparatus posture is the first posture and sets the operation mode in the second mode when the posture determining unit determines that the apparatus posture is a posture other than the first posture.

With the configuration according to the aspect of the invention, it is possible to switch the operation mode according to simple determination for determining whether the apparatus posture is the first posture.

The printing apparatus may further include: a display unit; and a display control unit configured to hide display of the display unit and/or extinguish a light of the display unit when the apparatus posture changes from the posture other than the first posture to the first posture.

With the configuration according to the aspect of the invention, since the display unit is unnecessary during the first mode, it is possible to prevent unnecessary power consumption by hiding the display and/or extinguishing the light.

The printing apparatus may further include: a detecting unit configured to detect information of a printing medium; and a transmitting unit configured to transmit a detection result of the detecting unit to the external apparatus when the apparatus posture changes from the posture other than the first posture to the first posture.

With the configuration according to the aspect of the invention, during the first mode switching, since the detection result of the detecting unit necessary during the first mode is automatically transmitted, it is possible to save labor and time of the user for setting the information of the printing medium.

The printing apparatus may further include a connection-establishment processing unit configured to spontaneously perform connection establishment processing for establishing connection to the external apparatus when the apparatus posture changes from the posture other than the first posture to the first posture.

With the configuration according to the aspect of the invention, since the connection establishment processing for establishing connection to the external apparatus is performed during the first mode switching, it is possible to save labor and time of the user for performing the connection establishment processing.

The printing apparatus may further include: a printing unit configured to perform printing on the basis of printing data; and a discharge port for discharging a printed printing medium. The printing unit may prohibit printing execution when the posture determining unit determines that the apparatus posture is an apparatus posture in which the discharge port faces down.

With the configuration according to the aspect of the invention, since the printing execution is prohibited when it is determined that the apparatus posture is an apparatus posture in which the discharge port faces down, it is possible to prevent a deficiency due to a discharge failure of the printing medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

A printing apparatus and a control method for the printing apparatus according to the invention are explained with reference to the accompanying drawings. In an embodiment of the invention, an example is explained in which the printing apparatus according to the invention is applied to a tape printing apparatus.

Figure 1:
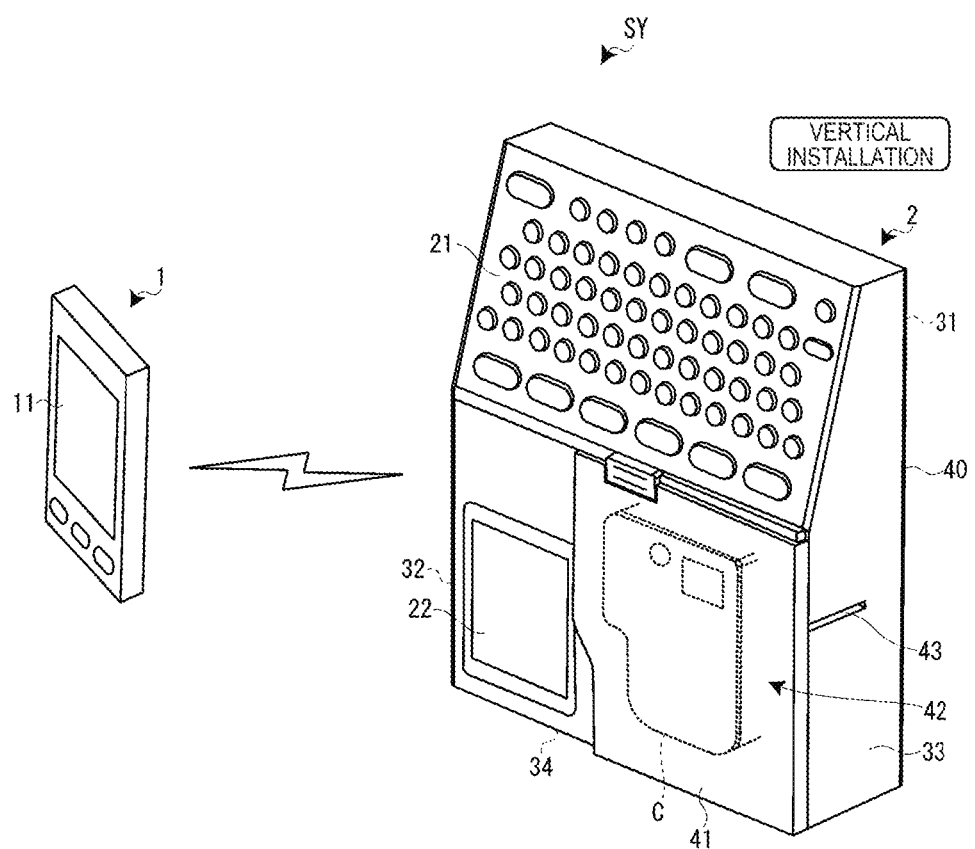
FIG. 1 is an external perspective view of a portable terminal and a tape printing apparatus in a vertical installation state.
Figure 2:
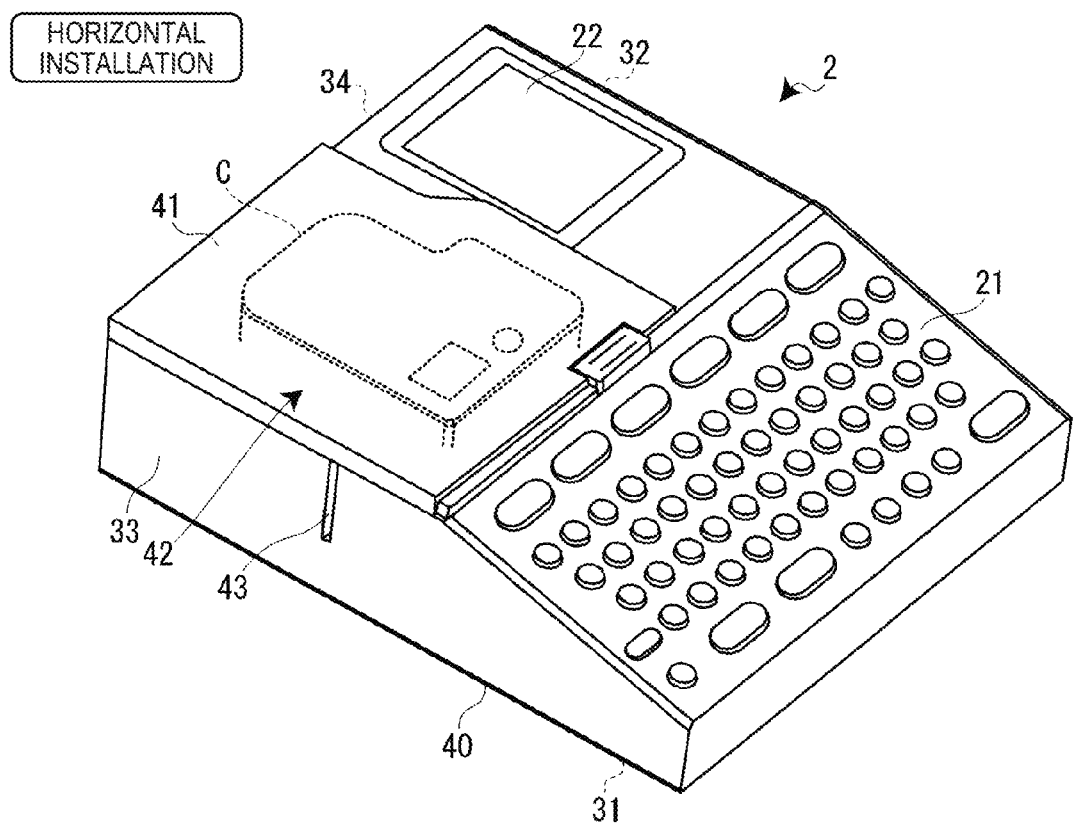
FIG. 2 is an external perspective view of the tape printing apparatus in a horizontal installation state.

A tape printing apparatus 2 in this embodiment can be used in a posture of "vertical installation" (a first posture) shown in FIG. 1 and a posture of "horizontal installation" shown in FIG. 2. The "vertical installation" means a posture in which a bottom surface 31 of the tape printing apparatus 2 is perpendicular to a setting table (not shown in the figure) (substantially parallel to the earth's axis), that is, a posture in which a rear surface 34 is a setting surface. The "horizontal installation" means a posture in which the bottom surface 31 of the tape printing apparatus 2 is horizontal to the setting table, that is, a posture in which the bottom surface 31 is the setting surface.

As explained in detail below, when the tape printing apparatus 2 is set in the posture of the "vertical installation", the tape printing apparatus 2 operates in an external communication mode (a first mode). The external communication mode is a mode for receiving printing data from a portable apparatus 1 (an external apparatus). On the other hand, when the tape printing apparatus 2 is set in the posture of the "horizontal installation", the tape printing apparatus 2 operates in a standalone mode (a second mode). The standalone mode is a mode for generating printing data on the basis of information input from a keyboard 21 of the tape printing apparatus 2.

FIG. 1 shows a printing system SY including the portable terminal 1 and the tape printing apparatus 2. The portable terminal 1 is realized by an information processing apparatus such as anyone of various tablet terminals (a smartphone, etc.) a notebook personal computer. In the figure, an example is shown in which a smartphone mounted with a touch panel 11 is used as the portable terminal 1. The portable terminal 1 communicates with the tape printing apparatus 2 according to wireless communication such as the Bluetooth (registered trademark). Note that, for the communication between the portable terminal 1 and the tape printing apparatus 2, a wired communication standard such as the USB communication or the Ethernet (registered trademark) may be used.

On the other hand, as shown in FIGS. 1 and 2, the exterior of the tape printing apparatus 2 is formed by an apparatus case 40. The keyboard 21 including various input keys and buttons is disposed on the front upper surface of the apparatus case 40. An openable lid 41 is attached to a left part of the rear upper surface of the apparatus case 40. A display screen 22 is disposed on a right part of the rear upper surface. A cartridge loading section 42 for loading a tape cartridge C is recessed and formed on the inner side of the openable lid 41. The tape cartridge C is loaded in the cartridge loading section 42 in a state in which the openable lid 41 is opened. A printing head 27a of a thermal system, a tape feeding motor 27b functioning as a tape conveying mechanism, a cutter motor 27c that drives a tape cutter 27d explained below, and the like are incorporated in the cartridge loading section 42. Note that the tape cartridge C houses a tape reel on which a printing tape, which is a long printing medium, is wound and a ribbon reel on which an ink ribbon is wound (none of the tape reel and the ribbon reel are shown in the figure).

In the left side part of the apparatus case 40, a tape discharge port 43, which causes the cartridge loading section 42 and the outside to communicate, is formed. The tape cutter 27d for cutting the printing tape reeled out from the tape cartridge C faces the tape discharge port 43. When the printed printing tape is fed out from the tape discharge port 43, the printing tape is cut by the tape cutter 27d in a state in which the feeding of the printing tape is once stopped. A strip-like label is created.

Figure 3:
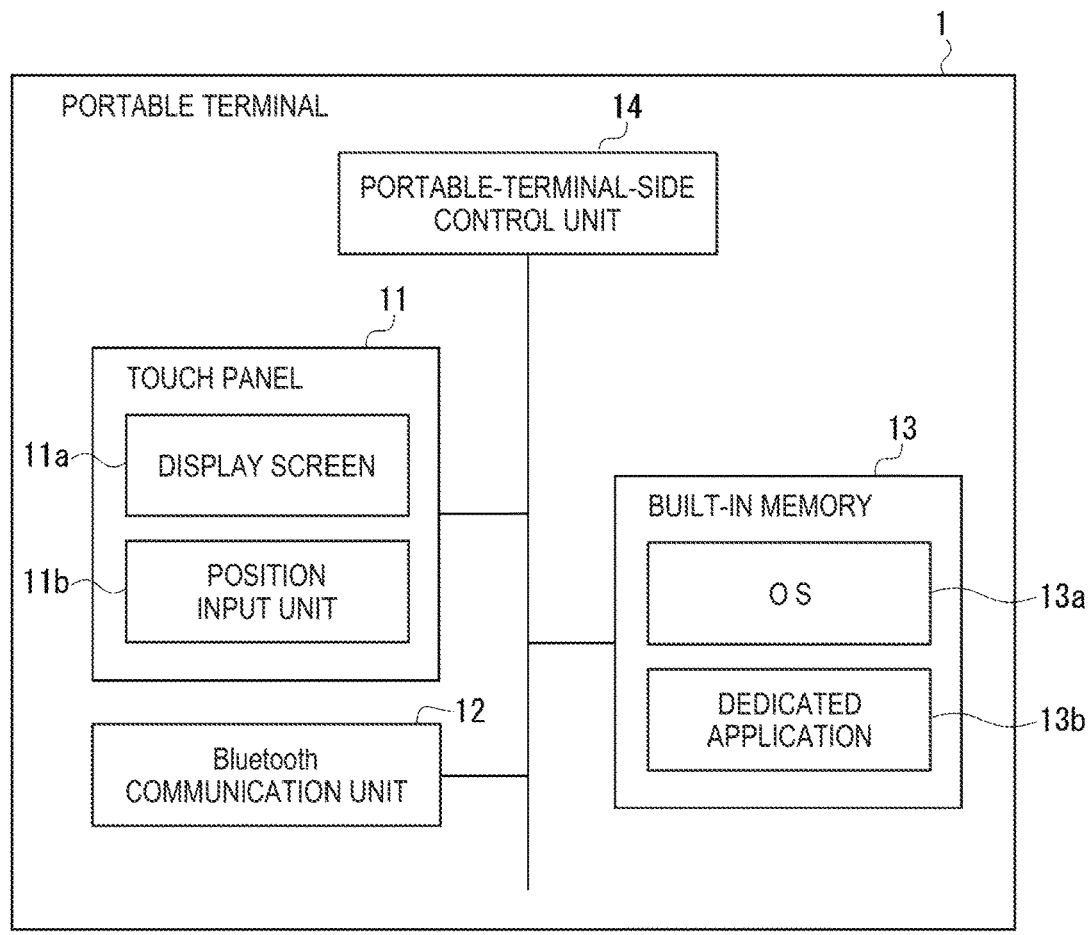
FIG. 3 is a block diagram showing a hardware configuration of the portable terminal.

Hardware configurations of the portable terminal 1 and the tape printing apparatus 2 are explained with reference to FIGS. 3 and 4. FIG. 3 is a block diagram of the portable terminal 1. The portable terminal 1 includes, as hardware components, the touch panel 11, a Bluetooth communication unit 12, a built-in memory 13, and a portable-terminal-side control unit 14.

The touch panel 11 includes a display screen 11a and a position input unit 11b. The display screen 11a is realized by a liquid crystal panel or the like. The display screen 11a displays various kinds of information such as an editing screen (not shown in the figure) for performing editing of a label. On the other hand, the position input unit 11b detects an operation position of a user according to a resistance film system or a capacitance system. The Bluetooth communication unit 12 performs wireless communication after performing pairing processing with the tape printing apparatus 2 to establish connection on the basis of the Bluetooth communication standard.

The built-in memory 13 is realized by, for example, a flash ROM (registered trademark). The built-in memory 13 stores an OS (Operating System) 13a and a dedicated application 13b. The dedicated application 13b is a smartphone application for controlling the tape printing apparatus 2.

The portable-terminal-side control unit 14 is realized by a CPU (Central Processing Unit), a RAM (Random Access Memory), and the like. The portable-terminal-side control unit 14 performs generation processing for printing data supplied to the tape printing apparatus 2 and communication control for communication with the tape printing apparatus 2 in cooperation with the units 11 to 13 explained above.

Figure 4:
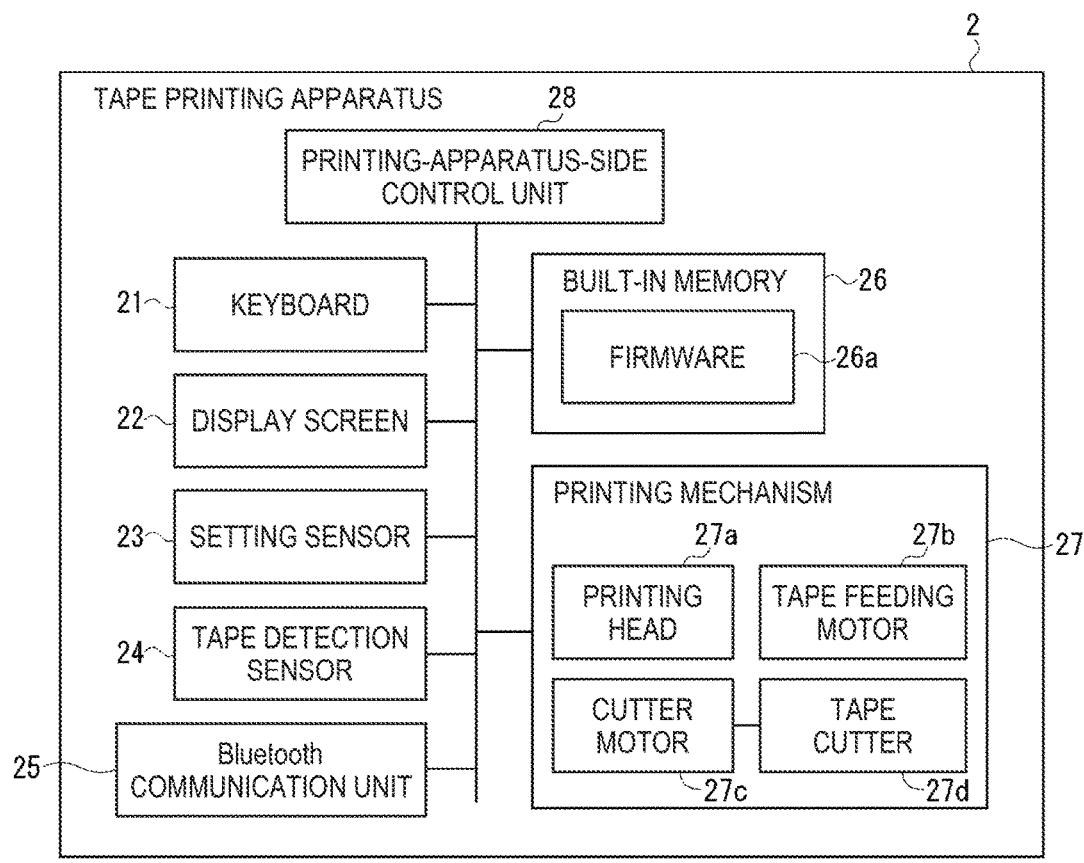
FIG. 4 is a block diagram showing a hardware configuration of the tape printing apparatus.

FIG. 4 is a block diagram of the tape printing apparatus 2. The tape printing apparatus 2 includes, as hardware components, the keyboard 21, the display screen 22, a setting sensor 23, a tape detection sensor 24, a Bluetooth communication unit 25, a built-in memory 26, a printing mechanism 27, and a printing-apparatus-side control unit 28.

The keyboard 21 is used to perform input of a text and selection of an image for generating printing data. The display screen 22 displays an input result (an editing result of a label) of the keyboard 21, a detection result of the tape detection sensor 24, and the like. Besides, the display screen 22 may display a set operation mode on the basis of a detection result of the setting sensor 23. The display screen 22 in this embodiment is realized by, for example, a liquid crystal screen. A backlight (a lighting mechanism) is provided on the display screen 22. The setting sensor 23 is realized by, for example, a gravitational acceleration sensor and detects an apparatus posture (a setting posture) of the tape printing apparatus 2.

The tape detection sensor 24 detects tape information concerning the printing tape stored in the tape cartridge C. The tape detection sensor 24 detects, as the tape information, a tape width, a tape material, a tape color, and the like of the printing tape. Note that, as a detection method, a method of reading an image (a barcode, a two-dimensional code, etc.) or RFID (Radio Frequency Identification) stuck or printed on the tape cartridge C, a method of detecting presence or absence of one or more holes formed in the tape cartridge C, and the like are conceivable. As detection timing, time when the tape printing apparatus 2 is turned on, time when the tape cartridge C is loaded, time when it is determined that the apparatus posture changes, time when setting of the operation mode is changed, and the like are conceivable. The Bluetooth communication unit 25 performs communication with the portable terminal 1 on the basis of the Bluetooth communication standard.

The built-in memory 26 is realized by, for example, a flash ROM (registered trademark). The built-in memory 26 stores firmware 26a of the tape printing apparatus 2. The printing mechanism 27 includes the printing head 27a, the tape feeding motor 27b, the cutter motor 27c, and the tape cutter 27d. The printing-apparatus-side control unit 28 is realized by a CPU, a RAM, and the like. The printing-apparatus-side control unit 28 performs communication control for communication with the portable terminal 1 and printing control in cooperation with the units 21 to 27. The printing-apparatus-side control unit 28 determines an apparatus posture on the basis of the detection result of the setting sensor 23 and sets the operation mode (the external communication mode or the standalone mode) according to the determined apparatus posture.

Figure 5:
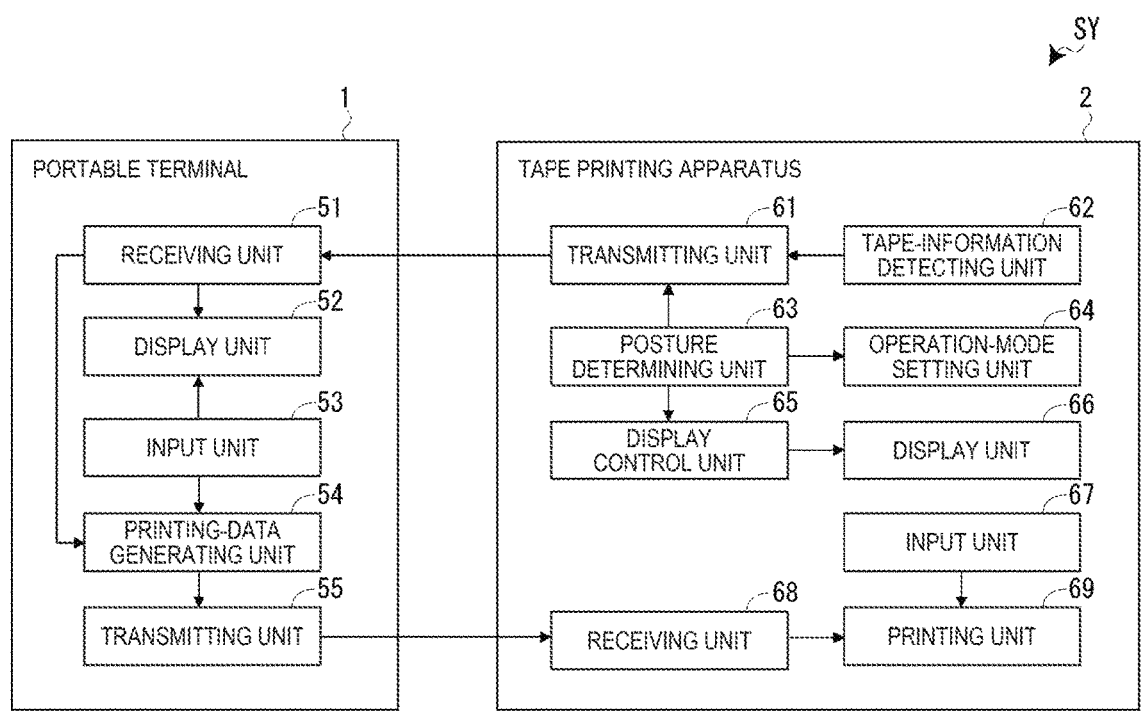
FIG. 5 is a block diagram showing a functional configuration of a printing system.

A functional configuration of the printing system SY is explained with reference to FIG. 5. The portable terminal 1 includes, as functional components, a receiving unit 51, a display unit 52, an input unit 53, a printing-data generating unit 54, and a transmitting unit 55.

The receiving unit 51 receives tape information from the tape printing apparatus 2 in a state in which the receiving unit 51 is capable of communicating with the tape printing apparatus 2 (when the operation mode of the tape printing apparatus 2 is set in the external communication mode). The input unit 53 is used to input information for generating printing data. The display unit 52 displays the received tape information and an input result of the input unit 53. The printing-data generating unit 54 generates printing data on the basis of the tape information and the input result of the input unit 53. The printing data includes various commands such as a command for printing a text and an image and a command for cutting the printing tape. The transmitting unit 55 transmits the generated printing data to the tape printing apparatus 2 in a state in which the transmitting unit 55 is capable of communicating with the tape printing apparatus 2.

On the other hand, the tape printing apparatus 2 includes, as functional components, a transmitting unit 61, a tape-information detecting unit 62 (a detecting unit), a posture determining unit 63, an operation-mode setting unit 64, a display control unit 65, a display unit 66, an input unit 67, a receiving unit 68, and a printing unit 69.

The tape-information detecting unit 62 is equivalent to the tape detection sensor 24 and detects tape information of the printing tape stored in the tape cartridge C. The posture determining unit 63 determines an apparatus posture of the tape printing apparatus 2 on the basis of the detection result of the setting sensor 23 (a posture determining step). Specifically, the posture determining unit 63 determines whether the tape printing apparatus 2 is in the posture of the "vertical installation" (see FIG. 1) or a posture other than the "vertical installation". When the posture determining unit 63 determines that the apparatus posture of the tape printing apparatus 2 is changed from the posture other than the "vertical installation" to the "vertical installation", the transmitting unit 61 transmits the tape information detected by the tape-information detecting unit 62 to the portable terminal 1.

When the posture determining unit 63 determines that the apparatus posture of the tape printing apparatus 2 is the "vertical installation", the operation-mode setting unit 64 sets the operation mode in the external communication mode (an operation mode setting step). The external communication mode is a mode for receiving printing data from the portable terminal 1 and disabling an information input from the input unit 67 (the keyboard 21). In the external communication mode, the tape printing apparatus 2 is capable of receiving various setting data such as file data from the portable terminal 1. When receiving the file data, the tape printing apparatus 2 stores the file data in a predetermined storage region in the built-in memory 26. Thereafter, when receiving a printing command for the file data from the portable terminal 1 during the external communication mode, the tape printing apparatus 2 reads out the file data designated by the printing command from the predetermined storage region and prints the file data. Note that the "vertical installation" is a posture in which the setting area of the tape printing apparatus 2 is as small as possible and is a posture in which the tape printing apparatus 2 is self-sustainable (see FIG. 1).

On the other hand, when the posture determining unit 63 determines that the apparatus posture of the tape printing apparatus 2 is the posture other than the "vertical installation", the operation-mode setting unit 64 sets the operation mode in the standalone mode. The standalone mode is a mode for generating printing data on the basis of information input from the input unit 67 without receiving printing data from the portable terminal 1. That is, the standalone mode is an operation mode for using the tape printing apparatus 2 alone. Note that, in this embodiment, as shown in FIG. 2, the operation mode is set in the standalone mode not only when the apparatus posture of the tape printing apparatus 2 is the "horizontal installation" but also when the apparatus posture is a posture in which a right side surface 32 of the tape printing apparatus 2 faces down.

The display unit 66 is equivalent to the display screen 22 and displays various kinds of information such as an editing result of a label during the standalone setting. When the posture determining unit 63 determines that the apparatus posture of the tape printing apparatus 2 is changed from the posture other than the "vertical installation" to the "vertical installation", the display control unit 65 hides the display of the display unit 66 and extinguishes the light (the backlight) of the display unit 66. Note that, when the apparatus posture is changed from the posture other than the "vertical installation" to the "vertical installation", apart of a display form of the display unit 66 only has to be changed to, for example, hide only a part of information displayed on the display unit 66 or reduce the illuminance of the backlight.

The input unit 67 is equivalent to the keyboard 21 and is used to input various kinds of information for generating printing data. The receiving unit 68 receives printing data from the portable terminal 1 during the external communication mode setting. During the standalone mode setting, the printing unit 69 prints printing data generated on the basis of the information input from the input unit 67. During the external communication mode setting, the printing unit 69 prints the printing data received from the portable terminal 1. When the posture determining unit 63 determines that the apparatus posture is an apparatus posture in which the tape discharge port 43 (a discharge port) faces down, the printing unit 69 prohibits printing execution. By prohibiting the printing execution in the case of the posture in which a left side surface 33 (see FIG. 2) of the tape printing apparatus 2 faces down in this way, it is possible to prevent a situation in which the printing tape is not discharged from the tape discharge port 43 and paper jam is caused.

A flow of operation mode setting processing of the tape printing apparatus 2 is explained with reference to a flowchart of FIG. 6. Note that the flowchart shown in the figure is periodically repeated after the power-on of the tape printing apparatus 2. The tape printing apparatus 2 determines whether the apparatus posture is the "vertical installation" (S01). When determining that the apparatus posture is the "vertical installation" (Yes in S01), the tape printing apparatus 2 broadcasts identification information of the tape printing apparatus 2 (S02) and establishes connection to the portable terminal 1 having identification information coinciding with the identification information of the tape printing apparatus 2 (S03). S02 and S03 are equivalent to "connection establishment processing" in the appended claims.

When the connection is established, first, the tape printing apparatus 2 disables key detection of the keyboard 21 (S04). The tape printing apparatus 2 hides the display of the display screen 22 and extinguishes the backlight (S05). The tape printing apparatus 2 disables an auto power-off function (a function of automatically turning off the power supply when a key input of the keyboard 21 is not detected for a predetermined time) (S06). Further, the tape printing apparatus 2 transmits tape information detected by the tape detection sensor 24 to the portable terminal 1 (S07) and thereafter sets the operation mode in the external communication mode (S08). On the other hand, when determining in S01 that the apparatus posture is the posture other than the "vertical installation" (No in S01), the tape printing apparatus 2 sets the operation mode in the standalone mode (S09).

As explained above, the tape printing apparatus 2 in this embodiment determines the apparatus posture of the tape printing apparatus 2 and sets the operation mode according to the determined apparatus posture. Therefore, when the user desires to change the operation mode, the user only has to change the apparatus posture of the tape printing apparatus 2. Operation of a button exclusive for operation mode switching or the like can be omitted. Since the operation mode is set in the external communication mode when the apparatus posture is the "vertical installation", it is possible to reduce the setting area and effectively use a work space on a desk.

The tape printing apparatus 2 in this embodiment always determines the apparatus posture in the power-on state. Therefore, the user can easily switch the operation mode without being required to perform operation of a power button and operation for determining the apparatus posture. The determination of the apparatus posture is simple determination concerning whether the apparatus posture is the "vertical installation". Therefore, it is possible to prevent erroneous determination as much as possible.

When the apparatus posture changes from the posture other than the "vertical installation" to the "vertical installation", the display of the display screen 22 is hidden and the backlight is extinguished. Therefore, it is possible to prevent useless power consumption during the external communication mode. Similarly, when the apparatus posture changes to the "vertical installation", the connection establishment processing is spontaneously performed or a detection result of the tape detection sensor 24 necessary during the external communication mode is transmitted to the portable terminal 1. Therefore, it is possible to save labor and time of the user for performing those kinds of operation after the switching to the external communication mode. The key detection of the keyboard 21 is disabled according to the posture change to the "vertical installation". Therefore, it is possible to prevent wrong operation of the keyboard 21 during the external communication mode. The auto power-off is disabled according to the posture change to the "vertical installation". Therefore, the tape printing apparatus 2 does not change to a power-off state against an intention of the user. Further, the printing execution is prohibited when it is determined that the apparatus posture is the apparatus posture in which the tape discharge port 43 faces down. Therefore, it is possible to prevent a deficiency due to discharge failure of the printing tape.

Note that modifications explained below are adoptable irrespective of the embodiment explained above.

Modification 1

The posture determining unit 63 in the embodiment explained above always determines the apparatus posture in the power-on state. However, the posture determining unit 63 may be configured to determine the apparatus posture only during the power-on and not determine the apparatus posture after the power-on. With this configuration, it is possible to prevent a malfunction in which the operation mode is switched against an intention of the user according to a change of the apparatus posture due to some cause.

Figure 6:
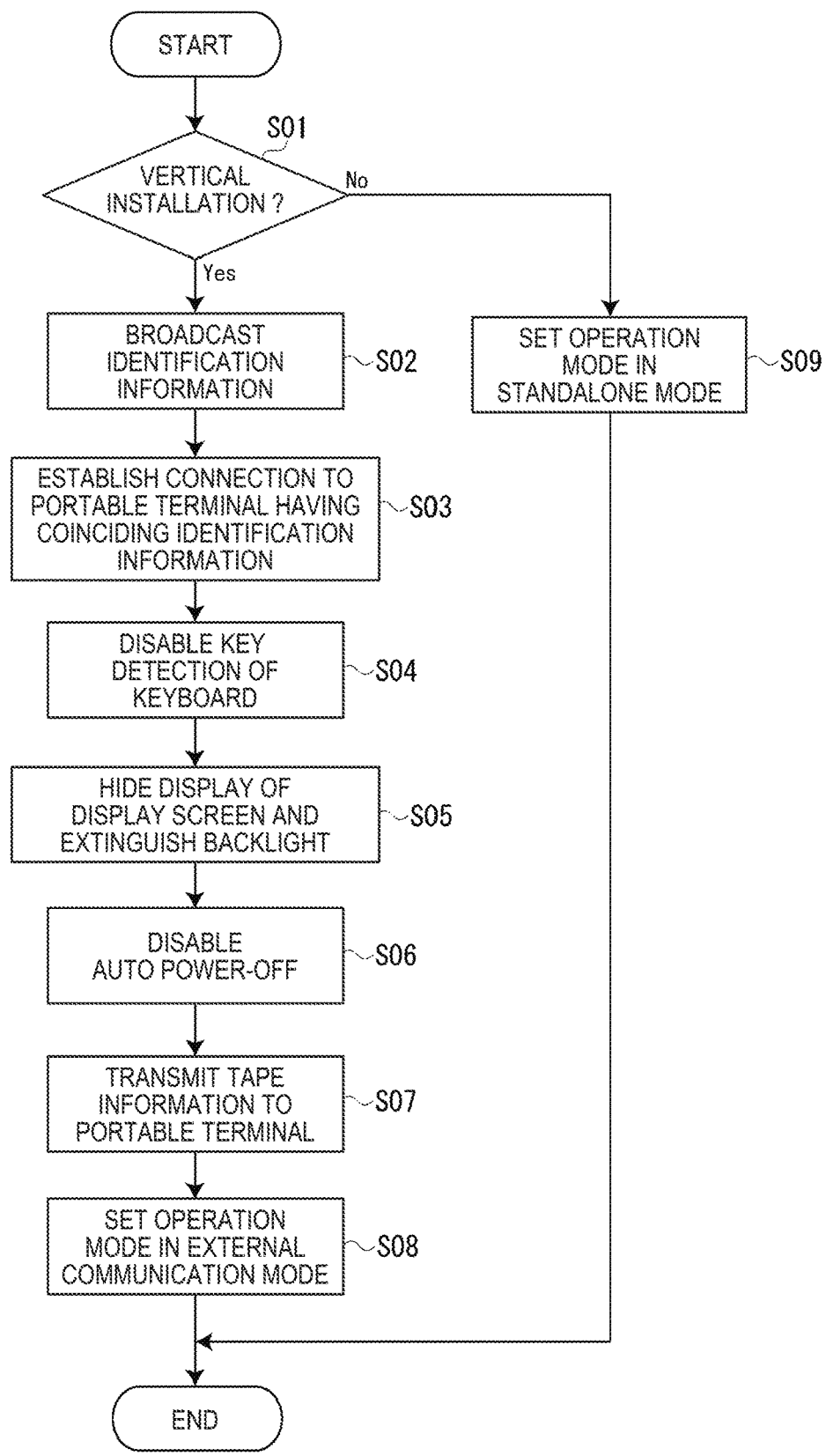
FIG. 6 is a flowchart for explaining a flow of operation mode setting processing of the tape printing apparatus.

As still another modification, the operation mode setting processing shown in FIG. 6 may be executed only when the apparatus posture changes. After the apparatus posture changes, the operation mode setting processing may be executed on condition that the same posture continues for a predetermined time.

Modification 2

In the embodiment explained above, the printing unit 69 prohibits the printing execution in the case of the apparatus posture in which the tape discharge port 43 faces down. However, the input itself of the input unit 67 may be prohibited.

Modification 3

The posture determining unit 63 in the embodiment explained above determines whether the apparatus posture is the "vertical installation". However, the posture determining unit 63 may determine whether the apparatus posture is the "vertical installation" or the "horizontal installation". In this case, when the posture determining unit 63 determines that the apparatus posture is the "vertical installation", the operation-mode setting unit 64 sets the operation mode in the external communication mode. When the posture determining unit 63 determines that the apparatus posture is the "horizontal installation", the operation-mode setting unit 64 sets the operation mode in the standalone mode. When the posture determining unit 63 determines that the apparatus posture is a posture other than the "vertical installation" and the "horizontal installation", the operation-mode setting unit 64 does not have to set the operation mode. That is, in the case of the posture other than the "vertical installation" and the "horizontal installation", the operation-mode setting unit 64 may set the operation mode in a third mode for disabling an information input from the input unit 67 without receiving printing data from the portable terminal 1.

As still another modification, the operation-mode setting unit 64 may be configured to set the operation mode in the external communication mode when the tape printing apparatus 2 is in the "vertical installation", set the operation mode in the third mode in the case of the posture in which the tape discharge port 43 of the tape printing apparatus 2 faces down, and set the operation mode in the standalone mode in the case of a posture other than the these postures.

As still another modification, the operation-mode setting unit 64 may be configured to set the operation mode in the standalone mode when the tape printing apparatus 2 is in the "horizontal installation", set the operation mode in the third mode in the case of the posture in which the tape discharge port 43 of the tape printing apparatus 2 faces down, and set the operation mode in the external communication mode in the case of a posture other than the these postures.

Modification 4

When the apparatus posture is changed from the posture other than the "vertical installation" to the "vertical installation", the display control unit 65 in the embodiment explained above hides the display of the display unit 66 (the liquid crystal screen) and extinguishes the light (the backlight) of the display unit 66. However, the display control unit 65 may perform the control on an LED or a button with an illumination function mounted on the tape printing apparatus 2. When an illumination function is mounted on the input unit 67 (the keyboard 21), the display control unit 65 may extinguish the illumination according to the change of the apparatus posture to the "vertical installation".

Other Modifications

The components in the printing system SY (the portable terminal 1 and the tape printing apparatus 2) explained in the embodiments and the modifications may be provided as a computer program. The computer program may be stored in various recording media (a CD-ROM, a flash memory, etc.) and provided. That is, a computer program for causing a computer to function as the components of the printing system SY and a recording medium having the computer program recorded therein are also included in the scope of the right of the invention. In the embodiment, the example is explained in which the printing apparatus according to the invention is applied to the tape printing apparatus. However, the invention is also applicable to a printing apparatus (including a printing apparatus not including a cutting function) other than the tape printing apparatus. Besides, changes are possible as appropriate without departing from the spirit of the invention to, for example, realize the portable terminal 1 with another information processing apparatus.

This application claims priority under 35 U.S.C. § 119 to Japanese Patent Application No. 2016-029377, filed Feb. 18, 2016. The entire disclosure of Japanese Patent Application No. 2016-029377 is hereby incorporated herein by reference.

What is claimed is:

1. A printing apparatus comprising:
an input unit through which a user of the printing apparatus inputs information into the printing apparatus; and
at least one processor configured to:
determine an apparatus posture;
set, according to the determined apparatus posture, an operation mode in one of a first mode for receiving printing data from an external apparatus and a second mode for generating printing data based on the information input from the input unit without receiving the printing data from the external apparatus;
set the operation mode in the first mode when the at least one processor determines that the apparatus posture is the predetermined first posture and set the operation mode in the second mode when the at least one processor determines that the apparatus posture is a posture other than the predetermined first posture; and
spontaneously perform connection establishment processing for establishing connection to the external apparatus when the apparatus posture changes from the posture other than the predetermined first posture to the predetermined first posture.

2. The printing apparatus according to claim 1, wherein the first mode is a mode for disabling the information input from the input unit.

3. The printing apparatus according to claim 1, wherein the at least one processor is further configured to determine the apparatus posture during power-on of the printing apparatus and does not determine the apparatus posture after the power-on.

4. The printing apparatus according to claim 1, further comprising:
a display unit; and
a display control unit configured to at least one of hide display of the display unit and extinguish a light of the display unit when the apparatus posture changes from the posture other than the predetermined first posture to the predetermined first posture.

5. The printing apparatus according to claim 1, wherein the at least one processor is further configured to:
   detect information of a printing medium; and
   transmit a detection result to the external apparatus when the apparatus posture changes from the posture other than the predetermined first posture to the predetermined first posture.

6. The printing apparatus according to claim 1, further comprising:
   a printing unit configured to perform printing based on the printing data received from the external apparatus and the printing data generated based on the information input from the input unit; and
   a discharge port for discharging a printed printing medium, wherein
   the printing unit prohibits printing execution when the at least one processor determines that the apparatus posture is an apparatus posture in which the discharge port faces down.

7. A control method for a printing apparatus including an input unit through which a user of the printing apparatus inputs information into the printing apparatus, the control method for the printing apparatus comprising:
   determining an apparatus posture;
   setting, according to the determined apparatus posture, an operation mode in one of a first mode for receiving printing data from an external apparatus and a second mode for generating printing data based on the information input from the input unit without receiving the printing data from the external apparatus;
   setting the operation mode in the first mode when the apparatus posture is the predetermined first posture and setting the operation mode in the second mode when the apparatus posture is a posture other than the predetermined first posture; and
   spontaneously performing connection establishment processing for establishing connection to the external apparatus when the apparatus posture changes from the posture other than the predetermined first posture to the predetermined first posture.

8. A printing apparatus comprising:
   an input unit for inputting information;
   a display unit; and
   at least one processor configured to:
   determine, while the printing apparatus is in a power-on state, an apparatus posture and whether the apparatus posture is a predetermined first posture;
   set, according to the determined apparatus posture, an operation mode in one of a first mode for receiving printing data from an external apparatus and a second mode for generating printing data based on the information input from the input unit without receiving the printing data from the external apparatus;
   set the operation mode in the first mode when the at least one processor determines that the apparatus posture is the predetermined first posture and set the operation mode in the second mode when the at least one processor determines that the apparatus posture is a posture other than the predetermined first posture; and
   hide display of the display unit and/or extinguish a light of the display unit when the apparatus posture changes from the posture other than the predetermined first posture to the predetermined first posture.

9. A printing apparatus comprising:
   an input unit for inputting information; and
   at least one processor configured to:
   determine, while the printing apparatus is in a power-on state, an apparatus posture and whether the apparatus posture is a predetermined first posture;
   set, according to the determined apparatus posture, an operation mode in one of a first mode for receiving printing data from an external apparatus and a second mode for generating printing data based on the information input from the input unit without receiving the printing data from the external apparatus;
   set the operation mode in the first mode when the posture determining unit at least one processor determines that the apparatus posture is the predetermined first posture and set the operation mode in the second mode when the posture determining unit at least one processor determines that the apparatus posture is a posture other than the predetermined first posture;
   detect information of a printing medium; and
   transmit a detection result of the detecting unit to the external apparatus when the apparatus posture changes from the posture other than the predetermined first posture to the predetermined first posture.

* * * * *